9812X
A. F. Mixsell,
Double-Acting Pump.
Patented June 30, 1836.
End Elevation.
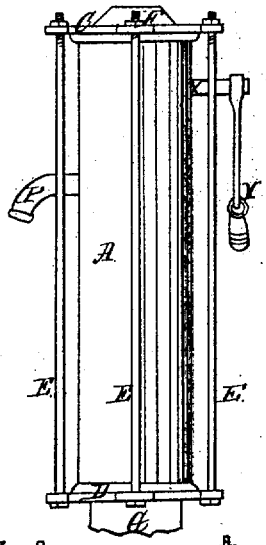
Back Elevation.
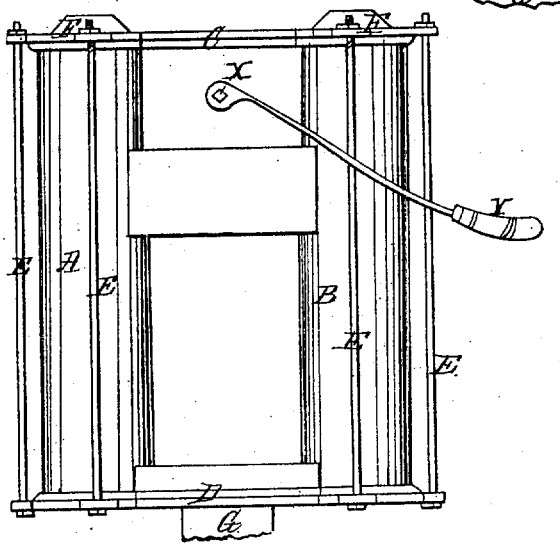
Section.
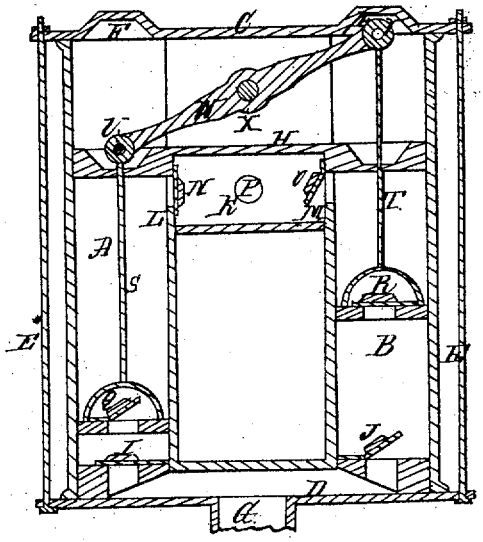
N. PETERS, PHOTO-LITHOGRAPHER, WASHINGTON, D. C.

June 30. 1836 9812X 209

Abraham T. Mixsell, of Oxford, N. Jersey

Letters Patent.

The schedule referred to, in these Letters Patent, and making part of the same, containing a description in the words of the said Abraham T. Mixsell himself of his improvement in the Double Lifting Pump Be it known that I Abraham T. Mixsell of Oxford in the County of Warren and State of New Jersey, have made an improvement in the Double Lifting Pump, which is described as follows, reference being had to the annexed drawings of the same making part of this specification This Pump consists of two vertical tubes A. B. cast together, having a plate C, with flanges, at the top, and another D, at the bottom, which close their ends, secured by screw-rods and nuts E. In the upper plate are cavities F. in which the ends of the vibrating lever work, In the lower plate is an aperture G, for the admission of the water to valves, Another plate H, is placed across the pump inside with cavities or depression in which the ends of the vibrating lever work in descending, In the bottom of each tube is a valve I. J. opening inwards, Below the middle plate is a rectangular chamber, K, formed by two partitions, L. M, in which are two other valves, N O, opening towards the centre of this chamber, The spout P, is placed in this chamber, In the tubes are two lifting valves Q. R. attached to the ends of rods, S. T, bent at their ends and passing over pulleys U. V, in the ends of the vibrating lever W. which lever is fastened to an axle X. turning in openings in the top of the pump by a lever or handle Y. on the end of the axle.

The pump is made principally of cast and wrought iron

9812X

By moving the handle to the right the valve R. is raised which creates a vacuum in the lower end of the tube A, the water at the same time rushes through the valve I. to fill the vacuum. Then by moving the handle to the left, the valve R. is depressed, which opens it whilst the water rushes through: then by moving the handle again to the right, the water above the lifting valve R, is raised and forced through the valve M. into the chamber K, from whence it is discharged through the spout P. Whilst this operation is going on a similar but alternate operation is performing in the opposite tube. Thus, by alternately moving the handle to the right and left, a constant stream of water is kept flowing through the spout.

What I claim as my invention, and which I desire to secure by Letters Patent, consists in the combination and arrangement of the several parts of the Double Lifting Pump as before described, made principally of Cast Iron.

Witnesses
Wm. P. Elliot
Saml. L. McKinnie

Abraham T. Mizell

Patented June 20. 1836.

Ex.d.
W.G.

[588

Drawing